(12) United States Patent
Kim et al.

(10) Patent No.: US 9,414,337 B2
(45) Date of Patent: Aug. 9, 2016

(54) METHOD FOR TRANSMITTING AND RECEIVING SYNCHRONIZATION SIGNALS IN WIRELESS ACCESS SYSTEM AND APPARATUS THEREFOR

(75) Inventors: Jinmin Kim, Anyang-si (KR); Seunghee Han, Anyang-si (KR); Hyukmin Son, Anyang-si (KR); Hyunwoo Lee, Anyang-si (KR); Hyeyoung Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/236,051

(22) PCT Filed: Aug. 23, 2012

(86) PCT No.: PCT/KR2012/006708
§ 371 (c)(1),
(2), (4) Date: Jan. 29, 2014

(87) PCT Pub. No.: WO2013/028018
PCT Pub. Date: Feb. 28, 2013

(65) Prior Publication Data
US 2014/0169361 A1   Jun. 19, 2014

Related U.S. Application Data

(60) Provisional application No. 61/526,661, filed on Aug. 23, 2011.

(51) Int. Cl.
*H04W 56/00* (2009.01)
*H04L 5/00* (2006.01)
(Continued)

(52) U.S. Cl.
CPC .............. *H04W 56/00* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

2007/0281642 A1    12/2007  Gorokhov
2008/0013516 A1*   1/2008   Zhang et al. .................. 370/342
(Continued)

FOREIGN PATENT DOCUMENTS

| KR | 1020100024337 | 3/2010 |
|---|---|---|
| KR | 1020110093632 | 8/2011 |
| WO | 2013/025039 | 2/2013 |

OTHER PUBLICATIONS

PCT International Application No. PCT/KR2012/006708, Written Opinion of the International Searching Authority dated Jan. 23, 2013, 21 pages.

(Continued)

*Primary Examiner* — Ian N Moore
*Assistant Examiner* — Justin T Van Roie
(74) *Attorney, Agent, or Firm* — Lee, Hong, Degerman, Kang & Walmey; Jonathan Kang; Michael Monaco

(57) ABSTRACT

The present invention relates to a method for transmitting and receiving synchronization signals in a wireless access system for supporting carrier aggregation/multiple cells (CA) and an apparatus therefor. Specifically, the present invention includes the steps of transmitting a first synchronization signal through an extension carrier which is not operated as a single carrier but is operated as a part of the CA, wherein a transmission area of the first synchronization signal differs from a transmission area of a second synchronization signal which is transmitted through a legacy carrier capable of being operated as the single carrier.

8 Claims, 10 Drawing Sheets

(a)

(b)

(51) Int. Cl.
*H04L 12/715* (2013.01)
*H04W 74/00* (2009.01)
*H04W 74/08* (2009.01)
*H04W 72/04* (2009.01)
*H04W 72/12* (2009.01)
*H04L 27/26* (2006.01)

(52) U.S. Cl.
CPC ........... *H04L 27/2675* (2013.01); *H04L 45/04* (2013.01); *H04W 56/0015* (2013.01); *H04L 27/2602* (2013.01); *H04W 72/042* (2013.01); *H04W 72/1289* (2013.01); *H04W 74/006* (2013.01); *H04W 74/008* (2013.01); *H04W 74/0833* (2013.01)

(56) References Cited

U.S. PATENT DOCUMENTS

| | | | | |
|---|---|---|---|---|
| 2010/0069119 | A1* | 3/2010 | Mueck et al. | 455/561 |
| 2010/0110873 | A1 | 5/2010 | Han et al. | |
| 2010/0135257 | A1* | 6/2010 | Higuchi et al. | 370/336 |
| 2012/0014330 | A1* | 1/2012 | Damnjanovic et al. | 370/329 |
| 2012/0307870 | A1* | 12/2012 | Hakola | H04W 72/0453 375/135 |
| 2013/0010619 | A1* | 1/2013 | Fong et al. | 370/252 |

OTHER PUBLICATIONS

PCT International Application No. PCT/KR2012/006708, Written Opinion of the International Searching Authority dated Jan. 23, 2013, 14 pages.

MediaTek Inc., "Discussion on Carrier Type Indication for Bandwidth Extension in LTE-Advanced," 3GPP TSG RAN WG1 Meeting #58bis, R1-094059, Oct. 2009, 4 pages.

Huawei, et al., "Additional carrier types—motivations and issues," 3GPP TSG RAN WG1 Meeting #66, R1-112463, Aug. 2011, 5 pages.

NTT Docomo, "On the need for additional carrier types in Rel-11 CA," 3GPP TSG RAN WG1 Meeting #66, R1-112428, Aug. 2011, 4 pages.

Motorola Mobility, "Additional Carrier Types for LTE Rel-11," 3GPP TSG RAN WG1 Meeting #66, R1-112438, Aug. 2011, 2 pages.

European Patent Office Application Serial No. 12825495.0, Search Report dated Mar. 24, 2015, 10 pages.

* cited by examiner

FIG. 7
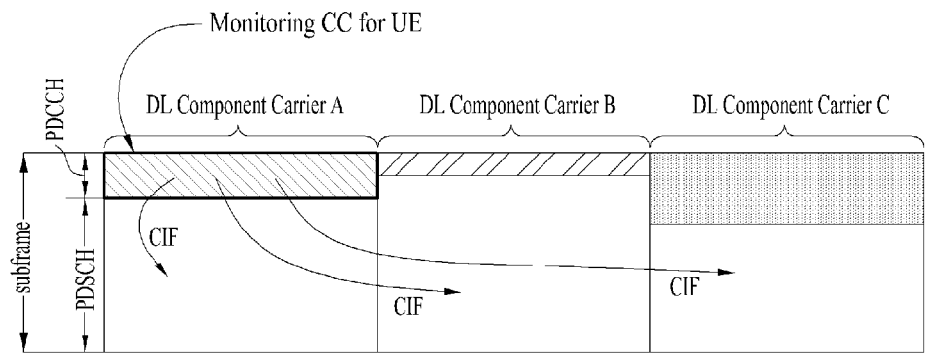
FIG. 8
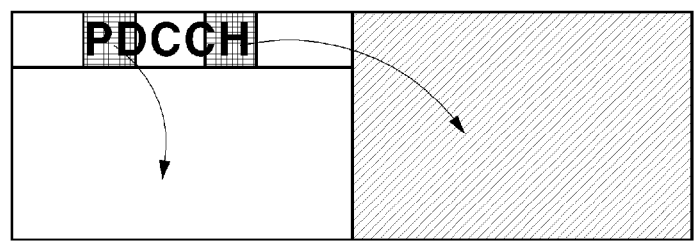
(a)
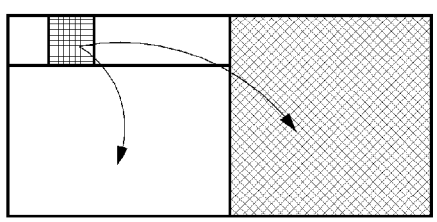
or
(b)

FIG. 9
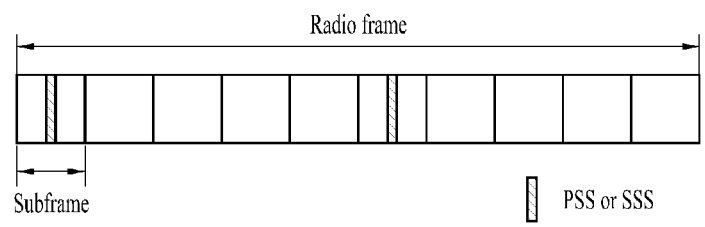
(a)
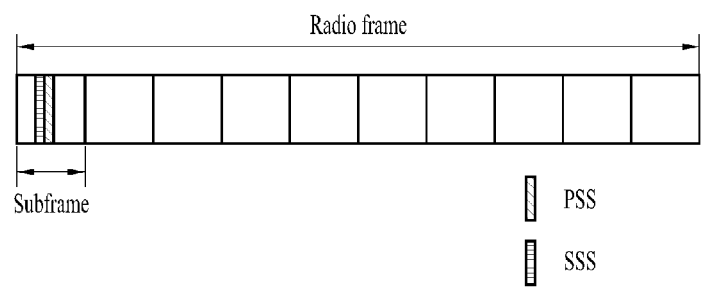
(b)

FIG. 10
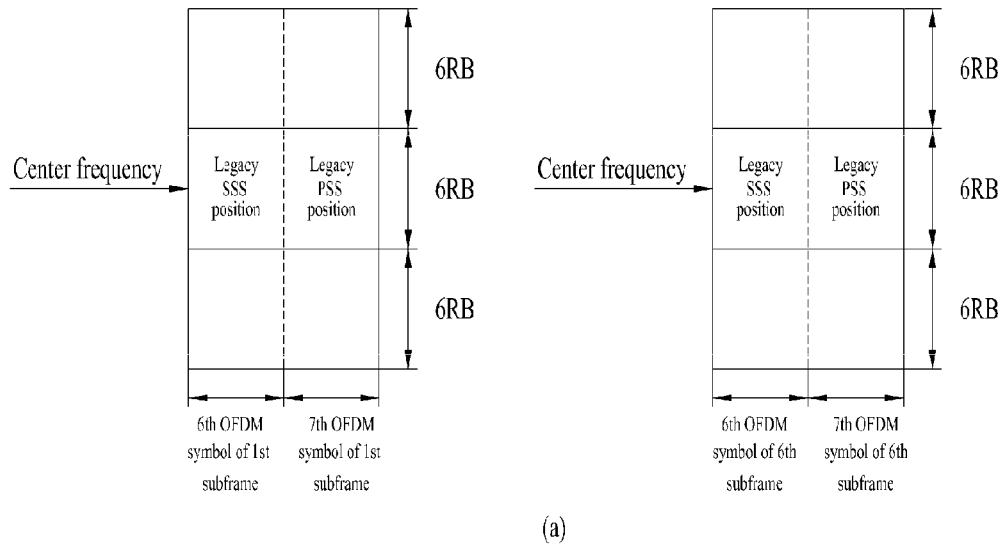
(a)
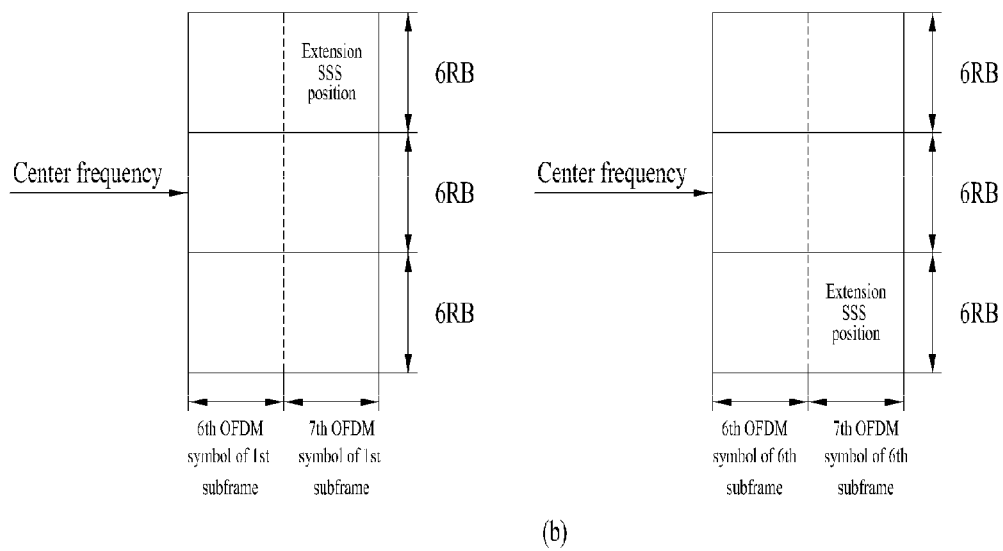
(b)

METHOD FOR TRANSMITTING AND RECEIVING SYNCHRONIZATION SIGNALS IN WIRELESS ACCESS SYSTEM AND APPARATUS THEREFOR

CROSS-REFERENCE TO RELATED APPLICATIONS

This application is the National Stage filing under 35 U.S.C. 371 of International Application No. PCT/KR2012/006708, filed on Aug. 23, 2012, which claims the benefit of U.S. Provisional Application Ser. No. 61/526,661, filed on Aug. 23, 2011, the contents of which are all hereby incorporated by reference herein in their entirety.

TECHNICAL FIELD

The present invention relates to a wireless access system, and more particularly, to a method of transmitting and receiving a synchronization signal in a wireless access system supporting carrier aggregation (multiple cells) and apparatus therefor.

BACKGROUND ART

One of the most significant requirements for the next generation wireless access system is the capability of supporting the high data rate requisite. To this end, many ongoing efforts are made to research and develop various technologies including MIMO (multiple input multiple output), CoMP (cooperative multiple point transmission), relay and the like.

In a wireless access system according to a related art, even if an uplink (UL) and a downlink (DL) are set to differ from each other in bandwidth, a single carrier is mainly taken into consideration. For instance, a wireless communication system having UL and DL carriers, each of which number is 1, and UL and DL bandwidths generally symmetric to each other is provided based on a single carrier.

Yet, considering the situation that frequency resources are saturated, as a method of securing broadband bandwidths to meet the higher data transmission rate requirements, CA (carrier aggregation/multiple cells) is introduced in a manner of designing each of scattered bandwidths to operate an independent system and aggregating a plurality of bands into a single system.

In this case, a carrier of an independently operable bandwidth unit is called a component carrier (hereinafter abbreviated CC). In order to support an increasing transmission size, 3GPP LTE-A or 802.16m keeps extending its bandwidth up to 20 MHz or higher. In this case, at least one or more component carriers are aggregated to support the broadband. For instance, if a single component carrier supports a bandwidth of 5 MHz, 10 MHz or 20 MHz, a system bandwidth is supported up to maximum 100 MHz by aggregating maximum 5 component carriers together.

DISCLOSURE OF THE INVENTION

Technical Tasks

One object of the present invention is to provide a method of transmitting and receiving a synchronization signal between a base station and a user equipment in a wireless access system, preferably, in a carrier aggregation supportive wireless access system and an apparatus therefor.

Another object of the present invention is to provide a method of performing synchronization on an extension carrier capable of operating as a part of carrier aggregation and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a synchronization signal in a wireless access system supporting carrier aggregation includes the step of transmitting a first synchronization signal on an extension carrier not operating as a single carrier but operating as a part of the carrier aggregation only, wherein a domain for transmitting the first synchronization signal is different from a domain for transmitting a second synchronization signal transmitted on a legacy carrier capable of operating as a single carrier.

To further achieve these and other advantages and in accordance with the purpose of the present invention, according to a different embodiment, a base station for transmitting a synchronization signal in a wireless access system supporting carrier aggregation includes an RF unit configured to transceive a radio signal and a processor configured to transmit a first synchronization signal on an extension carrier not operating as a single carrier but operating as a part of the carrier aggregation only, wherein a domain for transmitting the first synchronization signal is different from a domain for transmitting a second synchronization signal transmitted on a legacy carrier capable of operating as a single carrier.

Preferably, a frequency domain on which the first synchronization signal is transmitted corresponds to a domain where a center frequency of the frequency domain on which the first synchronization signal is transmitted is not an integer multiple of 100 kHz.

Preferably, the method further includes the step of transmitting information on a space between the frequency domain on which the first synchronization signal is transmitted and a center frequency of the extension carrier via an upper layer signaling.

Preferably, the method further includes the step of transmitting information on a space between a time domain in which the first synchronization signal is transmitted and a time domain in which the second synchronization signal is transmitted via an upper layer signaling.

Preferably, the first synchronization signal corresponds to at least one of a primary synchronization signal and a secondary synchronization signal.

Preferably, the first synchronization signal is transmitted one time only in a radio frame.

Preferably, the first synchronization signal is generated using a root sequence index except 25, 29, and 34.

To achieve these and other advantages and in accordance with the purpose of the present invention, as embodied and broadly described, according to one embodiment, a method of receiving a synchronization signal in a wireless access system supporting carrier aggregation includes the step of receiving a first synchronization signal on an extension carrier not operating as a single carrier but operating as a part of the carrier aggregation only, wherein a domain for transmitting the first synchronization signal is different from a domain for transmitting a second synchronization signal transmitted on a legacy carrier capable of operating as a single carrier.

To further achieve these and other advantages and in accordance with the purpose of the present invention, according to a different embodiment, a user equipment for receiving a synchronization signal in a wireless access system supporting carrier aggregation includes a processor configured to receive a first synchronization signal on an extension carrier not operating as a single carrier but operating as a part of the carrier aggregation only, wherein a domain for transmitting the first synchronization signal is different from a domain for transmitting a second synchronization signal transmitted on a legacy carrier capable of operating as a single carrier.

Preferably, a frequency domain on which the first synchronization signal is transmitted corresponds to a domain where a center frequency of the frequency domain on which the first synchronization signal is transmitted is not an integer multiple of 100 kHz.

Preferably, the method further includes the step of receiving information on a space between the frequency domain on which the first synchronization signal is transmitted and a center frequency of the extension carrier via an upper layer signaling.

Preferably, the method further includes the step of receiving information on a space between a time domain in which the first synchronization signal is transmitted and a time domain in which the second synchronization signal is transmitted via an upper layer signaling.

Preferably, the first synchronization signal corresponds to at least one of a primary synchronization signal and a secondary synchronization signal.

Preferably, the first synchronization signal is transmitted one time only in a radio frame.

Preferably, the first synchronization signal is generated using a root sequence index except 25, 29, and 34.

It is to be understood that both the foregoing general description and the following detailed description are exemplary and explanatory and are intended to provide further explanation of the invention as claimed.

Advantageous Effects

Accordingly, the present invention provides the following effects or advantages.

According to embodiment of the present invention, a synchronization signal can be smoothly transmitted and received between a base station and a user equipment in a wireless access system, preferably, in a carrier aggregation supportive wireless access system.

According to embodiment of the present invention, synchronization can be smoothly performed by transmitting and receiving a synchronization signal on an extension carrier capable of operating as a part of carrier aggregation.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a diagram for a subframe structure of LTE-A system in accordance with cross carrier scheduling;

FIG. 8 is a diagram for an example of a difference between a segment and an extension carrier;

FIG. 9 is a diagram for an example of a radio frame structure in which an extension PSS/SSS is transmitted according to one embodiment of the present invention;

FIG. 10 is a diagram for an example of a radio frame structure in which an extension PSS/SSS is transmitted according to one embodiment of the present invention;

BEST MODE

Mode for Invention

Figure 1:
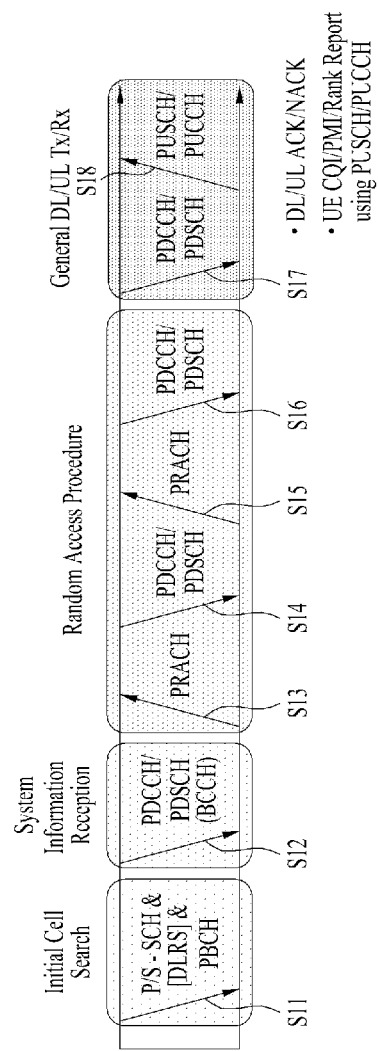
FIG. 1 is a diagram for explaining physical channels used for 3GPP LTE system and a general signal transmission method using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE-A System to which the Present Invention is Applicable 1.1. The General of System FIG. 1 is a diagram for explaining physical channels used for 3GPP system and a general signal transmission method using the same.

Referring to FIG. 1, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Meanwhile, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
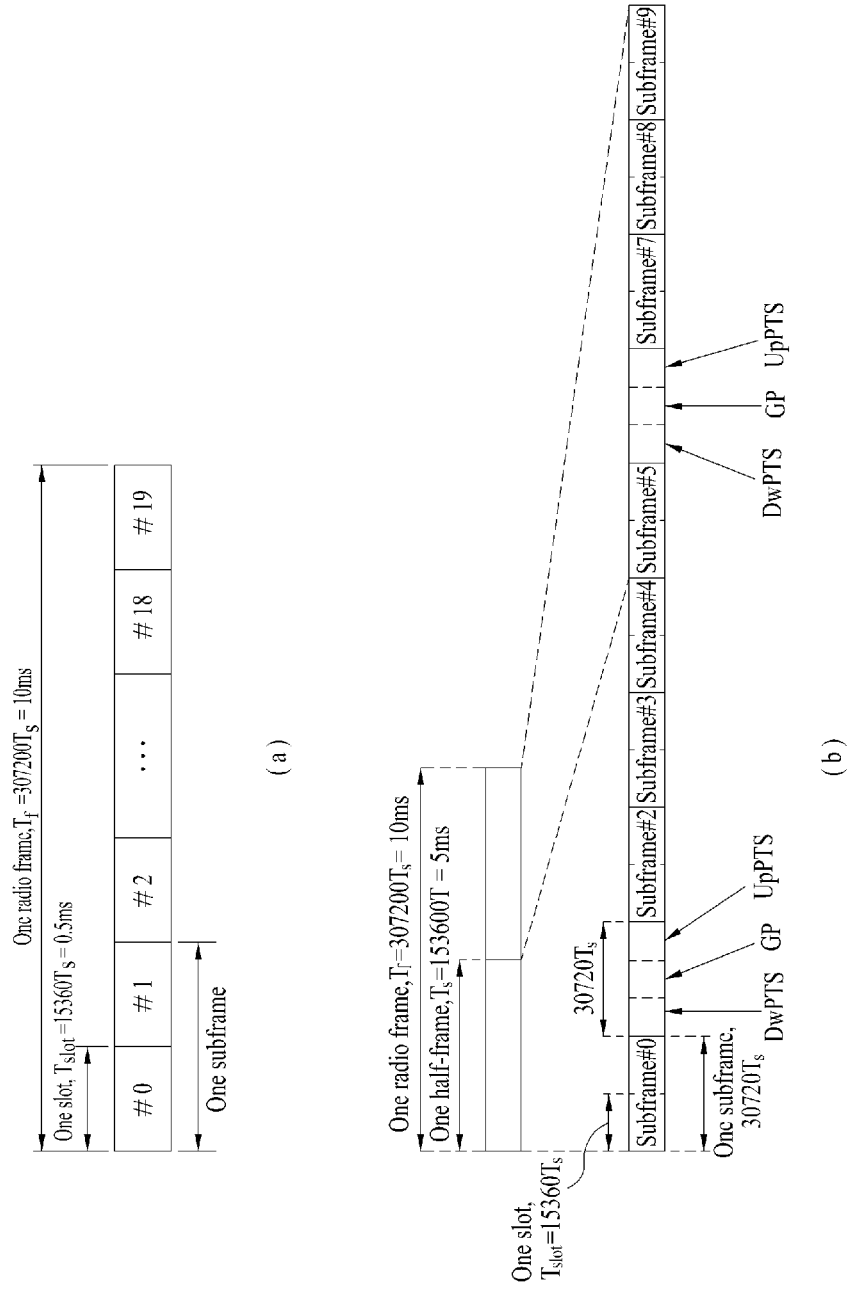
FIG. 2 is a diagram for a structure of a radio frame in 3GPP LTE.

FIG. 2 shows structures of radio frames in 3GPP LTE.

FIG. 2 (a) shows a frame structure type 1. This frame structure type 1 may be applicable to both a full duplex FDD (frequency division duplex) system and a half duplex FDD system.

One radio frame has a length of '$T_f = 307200 \cdot T_s = 10$ ms' and is constructed with 20 slots to which indexes 0 to 19 are respectively given with an equal length of '$T_{slot} = 15360 \cdot T_s = 0.5$ ms'. One subframe is defined as two contiguous slots. For example, an $i^{th}$ subframe is constructed with a slot corresponding to '2i' and a slot corresponding to '2i+1'. In particular, a radio frame includes 10 subframes. And, a time taken to transmit one subframe is called a transmission time interval (hereinafter abbreviated TTI). In this case, Ts indicates a sampling time and may be represented as '$T_s = 1/(15 \text{ kHz} \times 2048) = 3.2552 \times 10^{-8}$ (i.e., about 33 ns)'. One slot may include a plurality of OFDM or SC-FDMA symbols in time domain and may include a plurality of resource blocks (RBs) in frequency domain.

One slot includes a plurality of OFDM (orthogonal frequency division multiplexing) symbols in time domain. Since 3GPP uses OFDMA in downlink, OFDM symbol is provided to indicate one symbol period. The OFDM symbol may be named one SC-FDMA symbol or symbol period. Resource block (RB) is a resource allocation unit and may include a plurality of contiguous subcarriers in one slot.

In the full duplex FDD system, 10 subframes are simultaneously usable for DL and UL transmissions in each 10 ms interval. In doing so, the UL transmission and the DL transmission are separated from each other in frequency domain. On the contrary, in the half duplex FDD system, a user equipment is unable to perform a transmission and a reception at the same time.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

The above-described structure of the radio frame is one example only. And, the number of subframes included in a radio frame, the number of slots included in the subframe and the number of symbols included in the slot may be modified in various ways.

FIG. 2 (b) shows a frame structure type 2. The frame structure type 2 is applicable to the TDD system. One radio frame has a length of '$T_f=307200 \cdot T_s=10$ ms' and is constructed with 2 half-frames each of which has a length of '$15360 \cdot T_s=0.5$ ms'. Each of the half-frames is constructed with 5 subframes each of which has a length of '$30720 \cdot T_s=1$ ms'. For example, an $i^{th}$ subframe is constructed with a slot corresponding to '2i' and a slot corresponding to '2i+1', each of which has a length of '$T_{slot}=15360 \cdot T_s=0.5$ ms'. In this case, Ts indicates a sampling time and may be represented as '$T_s=1/(15\ kHz \times 2048)=3.2552 \times 10^{-8}$ (i.e., about 33 ns)'.

The type 2 frame includes a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

Table 1 shows a configuration (length of DwPTS/GP/UpPTS) of a special frame.

transmission bandwidth. And, the structure of an uplink (UL) slot may be identical to that of the DL slot.

Figure 4:
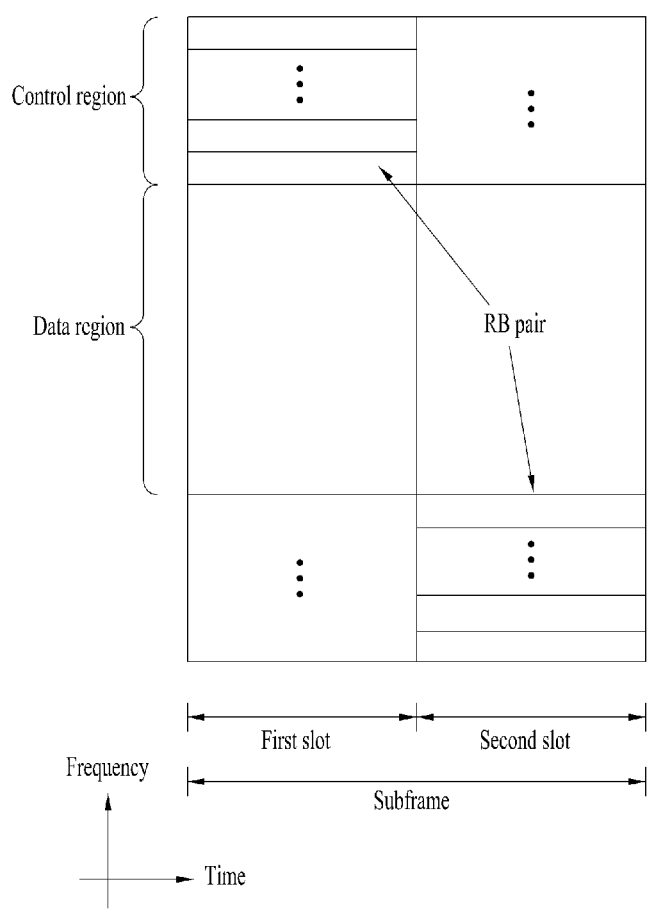
FIG. 4 is a diagram for a structure of an uplink subframe.

FIG. 4 is a diagram for a structure of an uplink (UL) subframe.

Referring to FIG. 4, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 5:
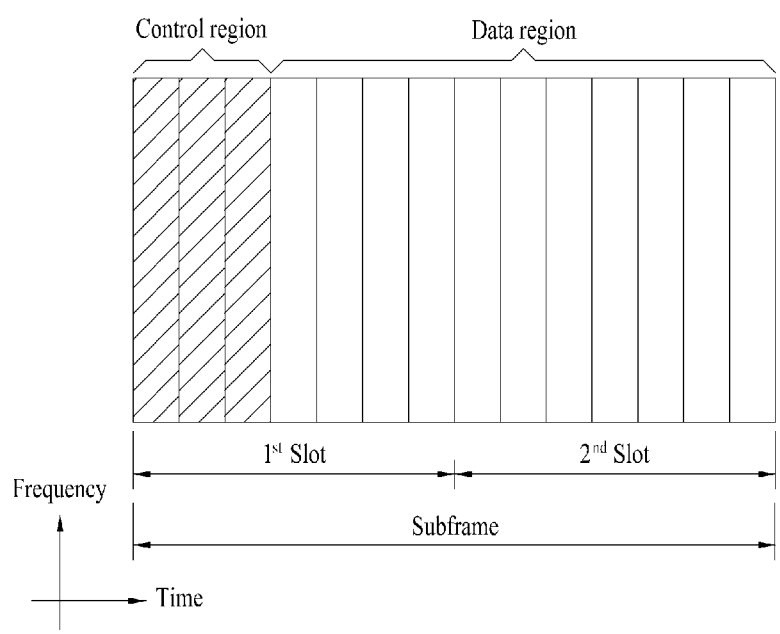
FIG. 5 is a diagram for a structure of a downlink subframe.

FIG. 5 is a diagram for a structure of a downlink (DL) subframe.

Referring to FIG. 5, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response to UL and carries ACK/NACK (acknowledgement/non-acknowledgement) signal for HARQ (hybrid automatic repeat

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_S$ | 2192 · $T_S$ | 2560 · $T_S$ | 7680 · $T_S$ | 2192 · $T_S$ | 2560 · $T_S$ |
| 1 | 19760 · $T_S$ | | | 20480 · $T_S$ | | |
| 2 | 21952 · $T_S$ | | | 23040 · $T_S$ | | |
| 3 | 24144 · $T_S$ | | | 25600 · $T_S$ | | |
| 4 | 26336 · $T_S$ | | | 7680 · $T_S$ | 4384 · $T_S$ | 5120 · $T_S$ |
| 5 | 6592 · $T_S$ | 4384 · $T_S$ | 5120 · $T_S$ | 20480 · $T_S$ | | |
| 6 | 19760 · $T_S$ | | | 23040 · $T_S$ | | |
| 7 | 21952 · $T_S$ | | | — | — | — |
| 8 | 24144 · $T_S$ | | | — | — | — |

Figure 3:
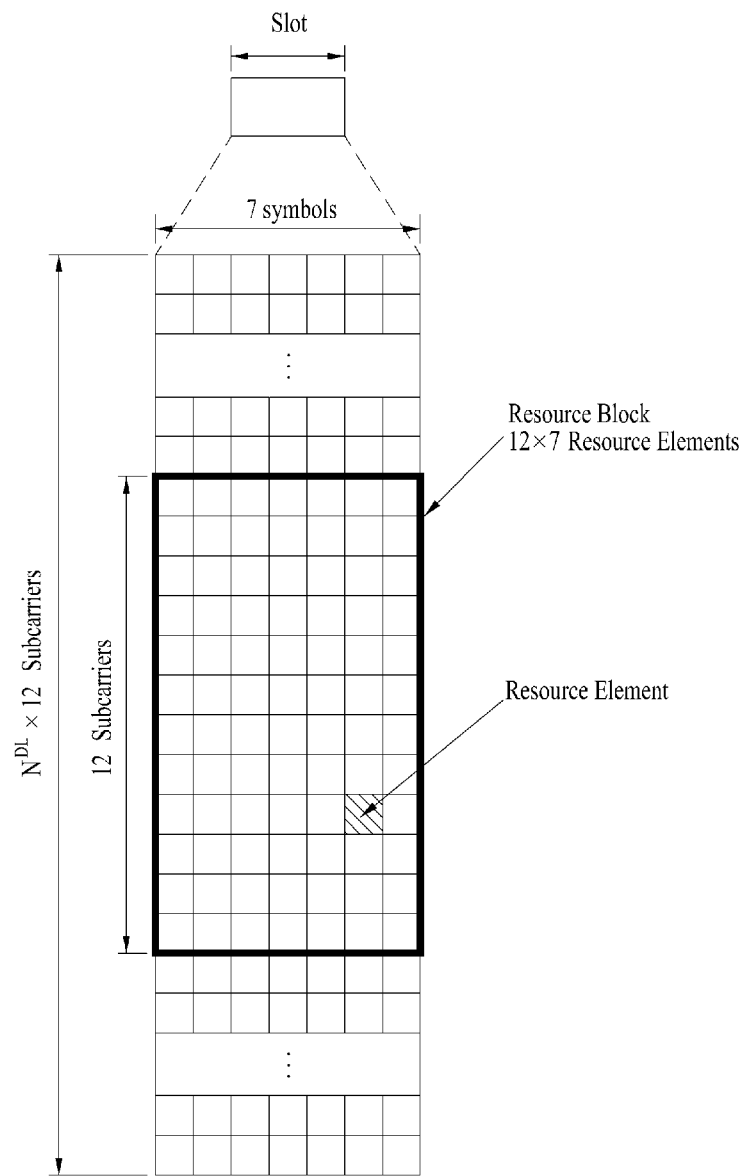
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL request). Control information carried on PDCCH may be called downlink control information (hereinafter abbreviated DCI). The DCI may include UL resource allocation information, DL resource allocation information or a UL transmission (Tx) power control command for a random UE (user equipment) group.

1.2. UL/DL Scheduling in TDD System 1.2.1. UL-DL Configuration in TDD System

In the frame structure type 2, UL-DL configuration indicates that all subframes are assigned to (or reserved for) UL and DL by a prescribed rule. Table 2 shows UL-DL configuration.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 2, in each subframe of a radio frame, 'ID' indicates a subframe for DL transmission, 'U' indicates a subframe for UL transmission, and 'S' indicates a special subframe constructed with 3 kinds of fields including DwPTS, GP and UpPTS. UL-DL configurations may be classified into 7 types. And, the respective configurations differ from each other in the positions or number of DL subframes, special frames and UL subframes.

A point of switching DL to UL or a point of switching UL to DL is called a switching point. Switch-point periodicity means a period in which a switching operation between UL and DL subframes is identically repeated and supports both 5 ms and 10 ms. In case of the 5 ms DL-UL switch-point periodicity, a special subframe (S) exists in every half-frame. In case of the 10 ms DL-UL switch-point periodicity, a special subframe (S) exists in a first half-frame only.

In all configurations, $0^{th}$ subframe, $5^{th}$ subframe and DwPTS are the intervals provided for the DL transmission only. UpPTS and a subframe immediately adjacent to a special subframe are the intervals for the UL transmission.

The above-mentioned UL-DL configuration may be known to both a base station and a user equipment. The base station is able to inform the user equipment of the change of the UL-DL assigned state of a radio frame in a manner of transmitting an index of configuration information each time UL-DL configuration information is changed. The configuration information is a sort of DL control information and can be transmitted on PDCCH (physical downlink control channel), which is a DL control channel, like other scheduling information. Moreover, the configuration information is a broadcast information and can be commonly transmitted to all user equipments in a cell on a broadcast channel. In the TDD system, the number of half-frames included in a radio frame, the number of subframes included in the half-frame and the combination of DL and UL subframes are just exemplary.

1.2.2. UL/DL Transmission Timing in TDD System

In case of a frame structure type 1, if a user equipment receives a PHICH including HARQ-ACK/NACK from a base station in an $i^{th}$ subframe, the PHICH corresponds to a PUSCH transmitted by the user equipment in i-4 UL subframe.

More specifically, if a specific user equipment receives a UL grant in an $n^{th}$ DL subframe, the user equipment transmits PUSCH in a corresponding n+4 UL subframe. And, if the user equipment transmits PUSCH in the n+4 UL subframe, a base station transmits PHICH, which is an ACK/NACK response for the PUSCH, in a corresponding n+8 DL subframe. In particular, having transmitted the PUSCH in the n+4 UL subframe, the user equipment should search/detect/demodulate the PHICH in a manner of anticipating that the PHICH response for the PUSCH transmitted by the user equipment in the n+8 subframe is transmitted from the base station.

On the contrary, in case of the frame structure type 2, since DL/UL subframe configuration differs from each other according to UL-DL configuration, PUSCH and PHICH transmission time are differently set in accordance with the configuration. And, the transmission time of PUSCH and that of PHICH may be differently configured in accordance with an index (or number) of a subframe.

In LTE system, UL/DL timing relation of PUSCH, PDCCH ahead of the PUSCH and PHICH for carrying DL HARQ ACK/NACK corresponding to the PUSCH is determined in advance.

Table 3 shows transmission timing relation between PUSCH and corresponding PHICH according to UL-DL configuration.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

Referring to Table 3, in case of UL/DL configuration 1 to 6, if a user equipment receives PHICH including HARQ-ACK/NACK from a base station in an $i^{th}$ DL subframe, the PHICH corresponds to PUSCH transmitted by the user equipment in i-k UL subframe. In this case, a value of k is depicted in Table 3.

In case of UL-DL configuration 0, a HARQ-ACK received on PHICH in a resource corresponding to $I_{PHICH}=0$ allocated to the user equipment in $i^{th}$ subframe corresponds to PUSCH transmitted by the user equipment in an i-k subframe. On the contrary, a HARQ-ACK received on PHICH in a resource corresponding to $I_{PHICH}=1$ allocated to the user equipment in $i^{th}$ subframe corresponds to PUSCH transmitted by the user equipment in an i-6 subframe.

Table 4 shows transmission timing relation between PUSCH and corresponding PHICH according to UL-DL configuration.

TABLE 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | | 4 | 6 |
| 1 | | | | 4 | 6 | | | | 4 | 6 |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | 4 | 6 | 6 | | | | | 4 | 7 |

If PUSCH transmission from a serving cell is scheduled in an $n^{th}$ UL subframe, PHICH (or ACK/NACK response) for the corresponding UL transmission is transmitted from a base station in an $n+k_{PHICH}$ DL subframe. The user equipment should search/detect/demodulate the PHICH in a manner of anticipating that the PHICH response for the PUSCH transmitted by the user equipment in the $n+k_{PHICH}$ DL subframe is transmitted from the base station. In case of a FDD system, $k_{PHICH}$ has a value of 4 all the time. In case of a TDD system, a value of $k_{PHICH}$ may refer to Table 4. In case of a subframe bundling operation, a corresponding PHICH resource corresponds to a last subframe in a bundle.

In the following description, a procedure for a user equipment to transmit PUSCH is explained.

In case of a normal HARQ operation in FDD system, if a user equipment detects PDCCH and/or PHICH including a DCI format 0 or 4 in $n^{th}$ subframe from a serving cell, the user equipment transmits a corresponding PUSCH in n+4 subframe according to information on the PDCCH and PHICH.

And, in case of a uplink spatial multiplexing, if the user equipment detects PHICH transmission in the $n^{th}$ subframe and fails to detect PDCCH including a DCI format 4, the user equipment retransmits the corresponding PUSCH in the n+4 subframe according to information on the PHICH. In this case, if the number of transport blocks in which NACK is received is identical to the number of transport blocks indicated by a latest PDCCH which is related to the corresponding PUSCH, the corresponding PUSCH is retransmitted using a precoding matrix according to the latest PDCCH and the number of transmission layers. On the contrary, if the number of transport blocks in which NACK is received is not identical to the number of transport blocks indicated by the latest PDCCH which is related to the corresponding PUSCH, the corresponding PUSCH is retransmitted using a precoding matrix according to a codebook index 0 and the number of transmission layers identical to the number of layers corresponding to the transport block in which NACK is received on the latest PDCCH.

Meanwhile, in case of a subframe bundling operation in FDD system, if a user equipment detects PDCCH including a DCI format 0 in an $n^{th}$ subframe and/or PHICH in an n−5 subframe, a corresponding first PUSCH in a bundle is transmitted in an n+4 subframe according to information on PDCCH and PHICH.

Table 5 shows transmission timing of PDCCH and corresponding PUSCH in accordance with UL-DL configuration.

TABLE 5

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | | 4 | | | 6 | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Table 6 shows transmission timing of PDCCH and corresponding PUSCH in case of UL-DL configuration 0, 1, and 6.

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 9 | 6 | | | | 9 | 6 | | |
| 1 | | | 2 | | 3 | | | 2 | | 3 |
| 6 | | 5 | 5 | | | | 6 | 6 | | 8 |

In case of UL-DL configuration 1 to 6 and a normal HARQ operation in a TDD system, if a user equipment detects PDCCH and/or PHICH including a UL DCI format in an $n^{th}$ subframe, the user equipment transmits a corresponding PUSCH in an n+k subframe according to information on the PDCCH and the PHICH.

In case of a UL-DL configuration 0 and a normal HARQ operation in a TDD system, when a user equipment detects PDCCH and/or PHICH including a UL DCI format in an $n^{th}$ subframe, if a most significant bit (MSB) of a UL index within the PDCCH including a UL DCI format is set to 1 or if the PHICH is received in a subframe index 0 or 5 within a resource corresponding to $I_{PHICH}=0$, the user equipment transmits a corresponding PUSCH in n+k subframe according to information on the PDCCH and the PHICH. In this case, a value of k may refer to Table 5.

On the contrary, in case of a UL-DL configuration 0 and a normal HARQ operation, if a least significant bit (LSB) of a UL index within a DCI format 0 or 4 is set to 1 in an $n^{th}$ subframe, if the PHICH is received in a subframe index 0 or 5 within a resource corresponding to $I_{PHICH}=1$, or if the PHICH is received in a subframe index 1 or 6, the user equipment transmits a corresponding PUSCH in n+7 subframe.

In case of a UL-DL configuration 0, if both a MBS and a LSB of a UL index within the PDCCH including a UL DCI format is set to 1 in an $n^{th}$ subframe, a user equipment transmits a corresponding PUSCH in both n+k subframe and n+7 subframe. In this case, a value of k may refer to Table 5.

Meanwhile, in case of a UL-DL configuration 1 to 6 and a subframe bundling operation, if a user equipment detects PDCCH including a DCI format 0 in an $n^{th}$ subframe and/or PHICH in n−1 subframe, a corresponding first PUSCH within a bundle is transmitted in n+k subframe according to information on the PDCCH and the PHICH. In this case, a value of k and a value of l may refer to Table 5 and Table 6, respectively.

In case of a UL-DL configuration 0 and a subframe bundling operation in a TDD system, when a user equipment detects PDCCH including a DCI format 0 in an $n^{th}$ subframe and/or PHICH in an n−1 subframe, if an MSB of a UL index within the DCI format 0 is set to 1 or $I_{PHICH}=0$, the user equipment transmits a corresponding first PUSCH within a bundle in n+k subframe according to information on the PDCCH and the PHICH.

In case of a UL-DL configuration 0 and a subframe bundling operation in a TDD system, if an LSB of a UL index within PDCCH including a DCI format 0 is set to 1 in an $n^{th}$ subframe, or $I_{PHICH}=1$, a user equipment transmits a corresponding first PUSCH within a bundle in n+k subframe according to information on the PDCCH and the PHICH.

In the following description, a procedure for a user equipment to transmit PUCCH is explained.

HARQ processing time of a FDD system may differ from that of a TDD system.

In case of the FDD system, if a user equipment detects PDCCH, which indicates PDSCH transmission or DL semi-persistent scheduling (SPS) release, in subframe(s) starting from n−4 subframe, the user equipment transmits HARQ-ACK/NACK response in an $n^{th}$ UL subframe.

Table 7 shows a DL association set index K({$k_0, k_1, \ldots k_{M-1}$}) in a TDD system according to each of UL-DL configurations.

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |

TABLE 7-continued

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of a TDD system, if a user equipment detects PDCCH, which indicates PDSCH transmission or DL SPS release, in subframe(s) starting from n-k subframe, the user equipment transmits HARQ-ACK/NACK response in an $n^{th}$ UL subframe. In this case, it may be represented as k∈K. The K is differently defined according to UL-DL configurations as depicted in Table 7.

In the following description, a procedure for a user equipment to report HARQ-ACK/NACK is explained.

Table 8 shows DL assignment index values.

TABLE 8

| DAI MSB, LSB | $V_{DAI}^{UL}$ or $V_{DAI}^{DL}$ | Number of subframes with PDSCH transmission and with PDCCH indicating DL SPS release |
|---|---|---|
| 0, 0 | 1 | 1 or 5 or 9 |
| 0, 1 | 2 | 2 or 6 |
| 1, 0 | 3 | 3 or 7 |
| 1, 1 | 4 | 0 or 4 or 8 |

Table 9 shows a UL association index K in a TDD system according to UL-DL configurations.

TABLE 9

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

In a TDD system, in case of UL-DL configuration 1 to 6, a DL assignment index (DAI) value ($V_{DAI}^{UL}$) within a DCI format 0 or 4 detected by a user equipment in n-k' subframe means the total numbers of subframes in which the PDCCH and the PDSCH, which indicate DL SPS release to the corresponding user equipment, are transmitted in all subframe(s) starting from the n-k subframe. In this case, the $V_{DAI}^{UL}$ and the k' may refer to Table 8 and Table 9, respectively. Referring to Table 7, it may be represented as k∈K. The DAI value ($V_{DAI}^{UL}$) includes both PDSCH where a corresponding PDCCH exists and PDSCH where the corresponding PDCCH does not exist in all subframe(s) starting from the n-k subframe. If both the PDSCH and the PDCCH, which indicates the DL SPS resource release, are not transmitted, the user equipment expects that the DAI value is set to 4 within the DCI format 0 or 4.

In a TDD system, in case of UL-DL configuration 1 to 6, the DAI value in DCI format 1, 1A, 1B, 1D, 2, 2A, 2B, and 2C defines the accumulated numbers of PDCCHs, which allocate PDSCH transmission and indicate DL SPS release, from the subframe starting from n-k to a current subframe. In the case, k may be represented as k∈K according to the Table 7. The $V_{DAI}^{UL}$ means a DAI value within PDCCH including a DCI format 1, 1A, 1B, 1D, 2, 2A, 2B, or 2C detected by a user equipment in n-$k_m$ subframe according to Table 8. In this case, the $k_m$ indicates a smallest value among the K set defined in Table 7 and means a subframe index used for detecting the DCI format 1, 1A, 1B, 1D, 2, 2A, 2B, and 2C by the user equipment.

2. Carrier Aggregation Environment 2.1. The General of Carrier Aggregation

Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

Serving cell (e.g., PCell, SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has an integer value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of an upper layer, which contains mobility control information (mobilityControlInfo)

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an additional radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of an upper layer. E-UTRAN may perform a dedicated signaling having a parameter differing per user equipment rather than broadcasting in a related SCell. After an initial security activating process has started, E-UTRAN may be able to configure a network including at least one SCell in addition to PCell configured in the early stage of a connection establishment process. The PCell provides NAS (non-access-stratum) such as secured input and upper layer system information (e.g., TAI (tracking area identity)). The SCell is used to provide an additional downlink and optional uplink radio resources. E-UTRAN may independently add, eliminate, or modify the SCell via an RRC connection reconfiguration procedure using an RRC connection reconfiguration (RRCConnectionReconfiguration) message including mobility control information (mobilityControlInfo) or an RRC connection reconfiguration message not including the mobility control information.

Cross carrier scheduling is not applied to the PCell. In particular, the PCell is always scheduled via PDCCH of the PCell. And, UL resource allocation (UL grant) and DL resource allocation (DL assignment) of a cell are always scheduled in the identical cell. In particular, DL is scheduled on a component carrier #2 and UL is scheduled on the component carrier #2 as well. And, an order of PDCCH is always transmitted via the PCell. Similar to a different UL resource allocated to the PCell, the order of PDCCH is also applied to a processing of a carrier indicator field (CIF). And, MAC (medium access control) activation/deactivation of the SCell is maintained. Moreover, a pathloss reference for a UL CC can be configured with a DL CC linked by a SIB2 (system information block type 2). The pathloss reference for the UL CC can be configured with the PCell as well. And, frame timing, SFN (system frame number) timing, and TDD configuration are identically aligned between cells capable of being aggregated.

In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

Figure 6:
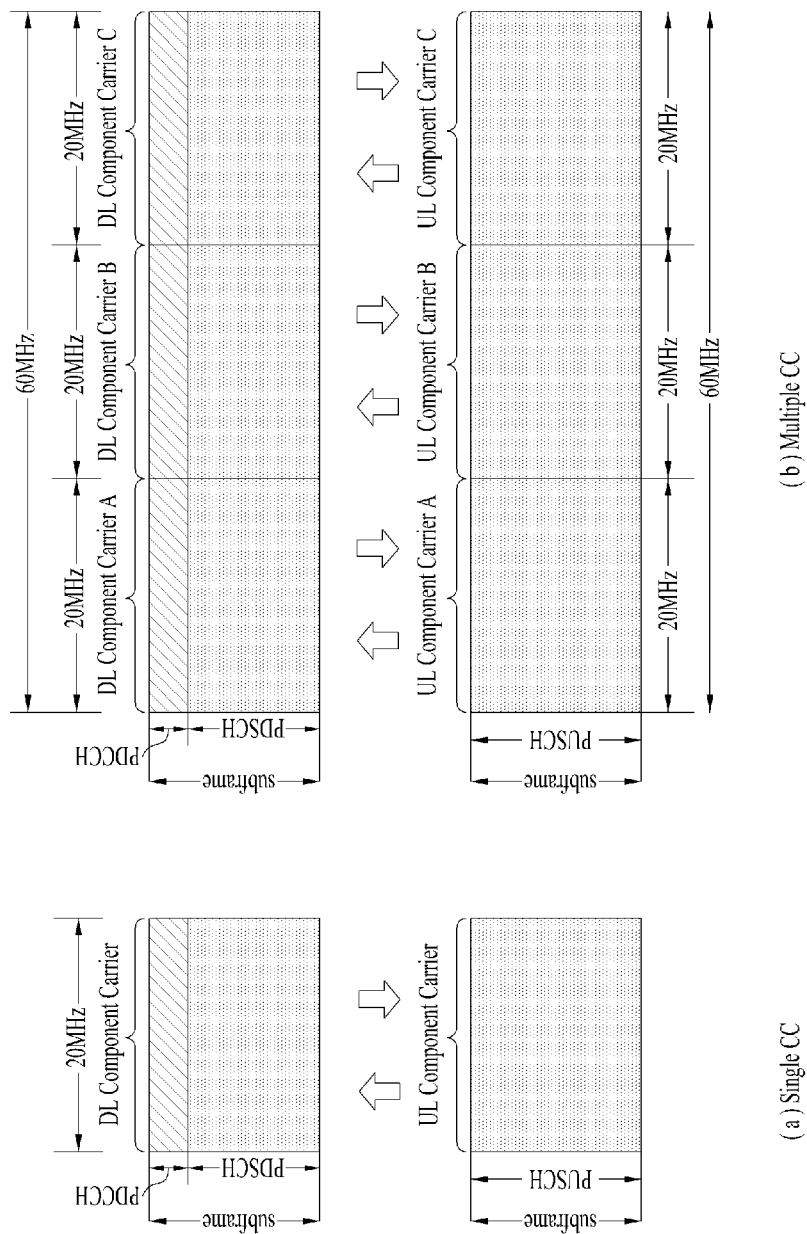
FIG. 6 is a diagram for one example of component carriers of LTE system and carrier aggregation used by LTE-A system.

FIG. 6 is a diagram for one example of component carriers of LTE system and carrier aggregation used by LTE-A system.

FIG. 6 (a) shows a single carrier structure used by LTE system. Component carriers include DL CC and UL CC. One component carrier may have a frequency range of 20 MHz.

FIG. 6 (B) shows a carrier aggregation structure used by LTE-A system. Referring to FIG. 6 (b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, M≤N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

2.2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL CC set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

FIG. 7 is a diagram for a subframe structure of LTE-A system in accordance with cross carrier scheduling.

Referring to FIG. 7, a DL subframe for an LTE-A user equipment represents a case that 3 DL CCs are combined and that DL CC 'A' is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

A user equipment may be able to transmit channel state information (CSI) (e.g., CQI (Channel Quality Indicator), RI (Rank Indication), PMI (Precoding Matrix Indicator), and the like) and such UL control informations as HARQ ACK/NACK and the like, which are received, detected, or measured on at least one CC, to a base station on a predetermined CC. For instance, when a user equipment transmits responses in response to data received from DL CC of PCell and DL CC of SCell, i.e., when a user equipment needs a plurality of ACK/NACK feedbacks, the user equipment collects (e.g., multiplexing, bundling, or the like) a plurality of the ACK/NACK feedbacks and then transmits them on UL CC of PCell using a single PUCCH.

2.3. Intra-Band and Inter-Band

The aforementioned carrier aggregation environment may be designed by intra-band carrier aggregation (CA) or inter-band CA. In this case, a band in both the intra-band and the inter-band means an operating band. The operating band means a frequency range operating (as paired or unpaired) in E-UTRA.

Table 10 shows an operating band defined in LTE system.

TABLE 10

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6[1] | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1743.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | |
| 21 | 1447.9 MHz-1462.9 MHz | 1495.9 MHz-1510.9 MHz | FDD |
| . . . | | | |
| 33 | 1900 MHz-1920 MHz | 1900 MHz-1920 MHz | TDD |
| 34 | 2010 MHz-2025 MHz | 2010 MHz-2025 MHz | TDD |

TABLE 10-continued

| E-UTRA Operating Band | Uplink (UL) operating band BS receive UE transmit $F_{UL\_low}$-$F_{UL\_high}$ | Downlink (DL) operating band BS transmit UE receive $F_{DL\_low}$-$F_{DL\_high}$ | Duplex Mode |
|---|---|---|---|
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |

Note[1]:
Band 6 is not applicable.

Intra-band CA means that a plurality of DL CCs and/or a plurality of UL CCs are positioned in a manner of being adjacent to each other or contiguous with each other on a frequency. In particular, the intra-band CA may mean that a carrier frequency of a plurality of the DL CCs and that of a plurality of the UL CCs are positioned in an identical operating band. Hence, a plurality of CCs can be designed under an assumption that a plurality of the CCs have a similar propagation attribute via the intra-band CA. In this case, the propagation attribute includes such various attributes capable of receiving impacts different from each other depending on a frequency (or center frequency) as propagation/path delay, propagation/path loss, a fading channel impact, and the like.

After matching a UL transmission timing for a primary cell UL CC, a user equipment identically uses a UL transmission timing of a secondary cell and the UL transmission timing for the primary cell under the aforementioned assumption (e.g., similar propagation/path delay between CCs and the like). Yet, a transmission timing of PRACH may be different from the above-mentioned transmission timing By doing so, a user equipment may be able to identically set a UL subframe boundary between cells. As a result, the user equipment may be able to perform a communication in a CA environment with a single RF (radio frequency) end.

Yet, due to a problem (e.g., allocation of a remaining frequency, reuse of a frequency previously used for a different purpose and the like) of frequency allocation allocated to a mobile communication service provider for a mobile communication and the like, one or more cells may be not adjacent to another cell(s) on a frequency in a CA environment. For instance, in case of constructing a carrier environment by 2 cells, a carrier frequency of one cell may correspond to 800 MHz (UL/DL) and a carrier frequency of another cell may correspond to 2.5 GHz (UL/DL). As a different example, a carrier frequency of one cell may correspond to 800 MHz (UL/DL) and a carrier frequency of another cell may correspond to 2.6 GHz (UL/DL). As a further different example, a carrier frequency of one cell may correspond to 700 MHz (UL/DL) and a carrier frequency of another cell may correspond to 1.7 GHz (UL)/2.1 GHz (DL). In this case, the carrier frequency may mean a center frequency between DL CCs or UL CCs. As mentioned in the foregoing examples, an environment far apart from each other in frequency domain is called inter-band carrier aggregation. In particular, the inter-band carrier aggregation may mean that a carrier frequency of a plurality of DL CCs and/or a plurality of UL CCs is positioned at bands different from each other. In the inter-band carrier aggregation environment, the assumption that the propagation attribute is similar to each other between cells cannot be maintained anymore. Hence, it is not able to assume that a subframe (in particular, UL) boundary is identically set between cells anymore in the inter-band carrier aggregation environment. Hence, it may be necessary to have UL transmission timings different from each other between cells. In doing so, a user equipment may use a plurality of RF (radio frequency) ends to perform a communication in the carrier aggregation environment.

3. Method of Synchronizing on Extension Carrier

LTE release-8/9/10 has been designed to enable all user equipments to access and/or use all cells. Yet, according to a following release (e.g., release-11), a cell or a carrier accessible or usable by a user equipment (e.g., a user equipment of LTE release 11 function) equipped with a new function only may be defined.

For instance, a carrier type may be defined as follows. The carrier type may be applicable to either a DL carrier or a UL carrier or, may be applicable to both. The carrier type may be used in a manner of being replaced by a cell type.

1) a Carrier Compatible with a Legacy System (Backwards Compatible Carrier)

This carrier means a carrier capable of being accessed by all existing LTE release user equipments. This carrier may operate as a single carrier (stand-alone) or a part of a carrier aggregation. In FDD system, this carrier always exists as a pair (UL and DL).

2) a Carrier not Compatible with a Legacy System (Non-Backwards Compatible Carrier)

LTE release user equipments, which define this sort of carrier, may access this carrier. Yet, user equipments of a previous LTE release cannot access this carrier. If non-compatibility with a legacy system is caused by a duplex distance (frequency difference between UL and DL), this carrier may operate as a single carrier (stand-alone). For the rest, this carrier may operate as a part of a carrier aggregation.

3) An Extension Carrier

This carrier cannot operate as a single carrier (stand-alone). This carrier means a carrier operating as a part of a component carrier set where at least one carrier included in the component carrier set corresponds to a stand-alone carrier. The extension carrier may have attributes as follow.

PBCH, SIB of release-8, and paging may not be transmitted.

PDCCH, PHICH, and PCFICH may not be transmitted. In particular, a control region may not exist. Yet, an advanced PDCCH (e-PDCCH) may be transmitted.

Mobility may be based on measurement on a component carrier compatible with a legacy system.

FIG. 8 is a diagram for an example of a difference between a segment and an extension carrier.

FIG. 8 (a) is a diagram for an example of an extension carrier and FIG. 8 (b) is a diagram for an example of a segment.

Referring to FIG. 8 (a), in case of an extension carrier, each PDCCH of a carrier compatible with a legacy system performs a resource allocation for PDSCH of the carrier compatible with a legacy system and an extension carrier.

On the other hand, as shown in FIG. 8 (b), in case of a segment, one PDCCH of a carrier compatible with a legacy system performs a resource allocation for PDSCH of the carrier compatible with a legacy system and a segment at the same time. And, in case of a segment, the segment should be configured as a bandwidth (BW) contiguous with a carrier compatible with a legacy system and a maximum bandwidth combined with the carrier compatible with a legacy system is limited to 110 RBs. On the contrary, in case of an extension carrier, the extension carrier can be managed without the aforementioned limit.

The extension carrier can be used to increase frequency efficiency (spectral efficiency) or reduce interference. Since resource allocation of the extension carrier is scheduled by PDCCH of a carrier compatible with a legacy system, a control signal of L1 (layer 1)/L2 (layer 2) is not transmitted. Hence, PDSCH can be transmitted from a first OFDM symbol since there does not exist a control region (PDCCH, PHICH, and PCFICH). In particular, in case that there exist small numbers of user equipments, overhead can be reduced by efficiently using an allocated control region, thereby enhancing the frequency efficiency.

Unlike the aforementioned contents, for clarity, carriers except 'carrier capable of being accessed by all LTE release user equipments' are commonly called an extension carrier in the following description of the present invention.

Meanwhile, there exists interference between homogeneous networks or heterogeneous networks in a wireless communication system of a cellular network. The interference may affect a control channel as well as a data channel. In LTE/LTE-A system, in order to reduce interference affecting the data channel (PDSCH), an ABS (almost blank subframe) is allocated to enable an interfered cell (victim cell) to receive a signal of no interference or a frequency domain can be orthogonally assigned to each user equipment positioned at a cell boundary using scheduling information between base stations. Yet, since a control channel (PDCCH, PCFICH, and PHICH) is transmitted to the ABS subframe as well, there exist a limit for the interfered cell to receive the signal of no interference. Hence, if an extension carrier not transmitting a control channel is configured as an ABS, it may be then able to make the interfered cell receive the signal of no interference.

As mentioned in the foregoing description, according to the explanation on the extension carrier, if the extension carrier exists in an intra-band together with a carrier compatible with a legacy system, timing synchronization information on the extension carrier can be obtained using the carrier compatible with the legacy system. If an extension carrier exists in an inter-band, a user equipment cannot maintain timing information on the extension carrier to be identical to that on a carrier compatible with a legacy system due to an RF chain from which propagation delay is considerably different. Hence, the present invention proposes a method for legacy user equipments not to initially access an extension carrier and a method to obtain timing synchronization information. In particular, the present invention proposes a configuration of an extension carrier when the extension carrier is used as UL. In the following description, assume that a physical layer cell ID for an extension carrier and/or information on system information (SIB) can be received from a carrier compatible with a legacy system.

In order for a user equipment to which an extension carrier is set to obtain initial synchronization information from the extension carrier or maintain a timing tracking, the user equipment can obtain the initial synchronization information using a primary synchronization signal (PSS) and a secondary synchronization signal (SSS) similar to a case that a legacy user equipment performs on a carrier compatible with a legacy system. Yet, to transmit the PSS/SSS in a manner of being identical to the carrier compatible with the legacy system may cause an error (e.g., unnecessary initial access attempt and the like) of the legacy user equipment. Hence, a following scheme may be taken into account.

3.1. Signaling PSS/SSS Transmission Position

A position to which a PSS/SSS (hereinafter abbreviated 'extension PSS/SSS') is transmitted on an extension carrier is different from a position to which a legacy PSS/SSS is transmitted on a carrier compatible with a legacy system. A base station can inform a user equipment of the position to which the extension PSS/SSS is transmitted. In this case, the base station may indicate the position to which the extension PSS/SSS is transmitted to the user equipment via an upper layer signal.

Among the positions to which the extension PSS/SSS is transmitted, a frequency domain position can be indicated by a random region except 6 RBs on the basis of a center frequency of an extension carrier. In this case, a designated frequency domain position can be indicated by an x RB apart from the center frequency of the extension carrier as much as the x RB. For instance, a space between a center frequency of the extension PSS/SSS and the center frequency of the extension carrier can be represented as the x RB. Moreover, a space between a first or a last RB of the extension PSS/SSS and the center frequency of the extension carrier can be represented as the x RB as well. And, x can be indicated by an index of an RB on a frequency axis. In this case, the x can be represented by a random integer. A value of the x can be transmitted on a carrier compatible with a legacy system. As an example, the value can be indicated by an upper layer signal. And, a unit of a frequency domain to which the extension PSS/SSS is transmitted may correspond to 6 RBs, which is identical to the unit of frequency domain to which the legacy PSS/SSS is transmitted. Yet, the unit of the frequency domain to which the extension PSS/SSS is transmitted may differ from the unit of frequency domain to which the legacy PSS/SSS is transmitted. In this case, information on a frequency bandwidth can also be informed to the user equipment.

A center frequency to which an extension PSS/SSS is transmitted can be configured not to be an integer multiple of a channel raster unit in order for the transmitted frequency domain position to limit an initial access of legacy user equipments. In this case, the channel raster corresponds to 100 KHz in all bands. In particular, this means that a carrier center frequency becomes an integer multiple of 100 KHz. Since a legacy user equipment obtains a PSS/SSS by performing initial synchronization in a channel raster unit, a center frequency to which an extension PSS/SSS is transmitted can be configured not to be an integer multiple of the channel raster unit to limit an initial access of the legacy user equipment.

Among the positions to which the extension PSS/SSS is transmitted, a time domain position can be indicated by a random region except PSS/SSS transmitted on a carrier compatible with a legacy system. In this case, a designated time domain position can be indicated by an OFDM symbol apart from the PSS/SSS transmitted on the carrier compatible with the legacy system as much as the x OFDM symbol. And, x can be indicated by a subframe and an OFDM symbol index in a time axis. In this case, the x can be represented by a random integer. A value of the x can be transmitted on the carrier compatible with the legacy system. As an example, the value can be indicated by an upper layer signal.

A base station may transmit information on both the frequency domain position and the time domain position to a user equipment. Or, the base station may transmit information on either the frequency domain or the time domain only to the user equipment to make the user equipment obtain timing information or cell identifier (ID) information in an extension carrier.

3.2. PSS/SSS Transmission in Stationary Position

The aforementioned (3.1.) scheme may have a demerit in that a separate signaling is required to inform a user equipment of an extension PSS/SSS transmission position. Hence, a scheme of limiting an initial access of a legacy user equipment in a manner of transmitting an extension PSS/SSS to a frequency domain except a channel raster and a scheme of transmitting the extension PSS/SSS to a user equipment without an overhead can be used in a current release-8/9/10 to minimize signaling overhead.

If a region different from a position to which a legacy PSS/SSS is transmitted is statically managed, an extension PSS/SSS can be statically managed in a region where a center frequency on which PSS/SSS is transmitted is not configured by an integer multiple of a channel raster unit. As mentioned in the foregoing description, legacy user equipments obtain PSS/SSS in a manner of performing an initial synchronization in an integer multiple units of 100 KHz. Hence, if the extension PSS/SSS is transmitted on an extension carrier except (100×n) KHz region, a legacy user equipment cannot find out the extension PSS/SSS and a user equipment to which the extension carrier is set can perform timing synchronization in a manner of detecting PSS/SSS in a region except (100×n) KHz unit. In this case, a value of the n can be represented by an integer less than 100.

In this case, a value (e.g., channel raster) except the (100×n) KHz may be signaled by an upper layer from a carrier compatible with a legacy system. And, a channel raster for an extension carrier can be managed by (100+n) KHz without a signaling. As an example, the channel raster may correspond to 150 KHz, 115 KHz, 130 KHz, 85 KHz, 70 KHz, or the like.

A user equipment can obtain an extension PSS/SSS for an extension carrier using a channel raster of a signaling or a fixed extension carrier and obtain a cell ID or timing information using the same.

3.3. Limited Transmission of PSS/SSS

In order for a user equipment to obtain timing information only instead of a cell identifier (ID), it is not necessary for the user equipment to receive PSS and SSS at the same time. Hence, either PSS or SSS is transmitted on an extension carrier to make the user equipment obtain timing synchronization and/or information.

FIG. 9 is a diagram for an example of a radio frame structure in which an extension PSS/SSS is transmitted according to one embodiment of the present invention. For clarity, the present embodiment assumes a normal cyclic prefix (CP) and a FDD system in the following description, by which the present embodiment may be non-limited. The present embodiment may be applicable to an extended CP or a TDD system as well.

FIG. 9 (a) shows an example of a structure for transmitting either an extension PSS or an extension SSS only in one subframe. A base station can transmit either the extension PSS or the extension SSS only in a $1^{st}$ and $6^{th}$ subframe of one radio frame. And, the base station may transmit the extension PSS only in the $1^{st}$ subframe and transmit the extension SSS only in the $6^{th}$ subframe of one radio frame. Moreover, the base station may transmit the extension SSS only in the $1^{st}$ subframe and transmit the extension PSS only in the $6^{th}$ subframe.

Since it may be assumed that a user equipment to which an extension carrier is set has a good channel state or quality on a corresponding frequency band, the base station may not respectively transmit the extension PSS and the extension SSS in one radio frame. Hence, as depicted in FIG. 9 (b), the base station may transmit the extension PSS and the extension SSS at one time in one radio frame. The base station may transmit both the extension PSS and the extension SSS in the $1^{st}$ subframe of one radio frame and may not transmit a synchronization signal in the $6^{th}$ subframe. Moreover, the base station may not transmit a synchronization signal in the $1^{st}$ subframe of one radio frame and may transmit both the extension PSS and the extension SSS in the $6^{th}$ subframe.

Similar to a case of FIG. 9 (a), in case of FIG. 9 (b), the base station may transmit either the extension PSS or the extension SSS only. In particular, the extension PSS may be transmitted in one subframe only among a $1^{st}$ and $6^{th}$ subframe. No synchronization signal may be transmitted in another subframe. And, the extension SSS may be transmitted in one subframe only among the $1^{st}$ and $6^{th}$ subframe. No synchronization signal may be transmitted in another subframe.

As mentioned in the foregoing description, if a synchronization channel is transmitted once in one radio frame, a user equipment can obtain timing information of 10 ms unit.

As mentioned earlier in (3.1.), a position of PSS or SSS described in FIG. 9 in time/frequency domain can be informed to a user equipment via signaling. As mentioned earlier in (3.1.), the position can be fixed in a region except a channel raster. An extension PSS or SSS may be transmitted in a position identical to that of a legacy PSS or SSS. This is because, according to the aforementioned scheme of transmitting an extension PSS/SSS, since either the extension PSS or the extension SSS is transmitted only or transmission is performed one time only for one radio frame, it may be able to limit an initial access, which is resulted from obtaining a synchronization channel obtained by a legacy user equipment, although the extension PSS/SSS is transmitted in a position identical to a position in which the PSS/SSS is transmitted on a carrier compatible with a legacy system.

3.4. Transmission Using Frequency Hopping

FIG. 10 is a diagram for an example of a radio frame structure in which an extension PSS/SSS is transmitted according to one embodiment of the present invention.

FIG. 10 (a) is an example of a radio frame in which a legacy PSS/SSS is transmitted. In time domain, a legacy PSS is transmitted on $7^{th}$ OFDM symbol of $1^{st}$ and $6^{th}$ subframe in one radio frame and a legacy SSS is transmitted on $6^{th}$ OFDM symbol of $1^{st}$ and $6^{th}$ subframe in one radio frame. And, in frequency domain, both the legacy PSS and SSS are transmitted via 6 RBs region on the basis of a center frequency of a corresponding carrier.

FIG. 10 (b) is an example of a radio frame in which an extension PSS/SSS on which a frequency hopping is performed is transmitted. According to a scheme of transmitting the extension PSS/SSS in accordance with the present invention, timing information of 10 ms unit or frequency diversity can be obtained in a manner of performing a frequency hopping between a first radio frame and a second radio frame.

In this case, a scheme of frequency hopping can be performed by 6 RBs on the basis of frequency domain on which a legacy PSS/SSS is transmitted. In particular, if an extension PSS/SSS is transmitted on a prescribed one side of frequency domain, which is adjacent to a frequency domain (6 RBs on the basis of a center frequency) on which the legacy PSS/SSS is transmitted, in a half radio frame, the extension PSS/SSS can be transmitted on an opposite side frequency domain, which is adjacent to the frequency domain (6 RBs on the basis of a center frequency) on which the legacy PSS/SSS is transmitted, in a second half radio frame.

A base station may indicate a specific frequency domain which becomes a reference of a frequency hopping. As an example, the specific frequency domain may be indicated via an upper layer signaling. In this case, the specific frequency domain indicated by the base station may correspond to a domain including a center frequency of an extension carrier or a domain not including a center frequency of an extension carrier. In this case, if the base station indicates a specific frequency domain, a user equipment performs a frequency hopping on the basis of the indicated specific frequency domain and may be able to transmit a synchronization signal.

And, a unit of the frequency domain on which the extension PSS/SSS is transmitted may correspond to 6RBs as depicted in FIG. 10 (b), by which the unit of the frequency domain on which the extension PSS/SSS is non-limited. The unit of the frequency domain on which the extension PSS/SSS is transmitted can also be indicated by the base station. As an example, the unit can be indicated by an upper layer signaling.

Although FIG. 10 (b) shows a case that an extension SSS is transmitted only, by which is non-limited. A frequency hopping may be performed to transmit an extension PSS only and the extension SSS may not be transmitted. Moreover, the extension PSS and the extension SSS can be alternately transmitted. Specifically, one synchronization signal among the extension PSS and the extension SSS is transmitted in a first half radio frame and another synchronization signal, which is not transmitted in the first half radio frame, can be transmitted in a second half radio frame in a manner of being frequency hopped.

Although FIG. 10 shows a case that an extension SSS is transmitted on a $7^{th}$ OFDM symbol of $1^{st}$ and $6^{th}$ subframe, by which non-limited. The extension SSS can be transmitted on a $6^{th}$ OFDM symbol of the $1^{st}$ and $6^{th}$ subframe. In case of transmitting an extension PSS, the extension PSS can also be transmitted on the $6^{th}$ or $7^{th}$ OFDM symbol. As mentioned in the foregoing description, in case of alternately transmitting the extension PSS and the extension SSS, the extension PSS and the extension SSS can be transmitted on the $6^{th}$ or $7^{th}$ OFDM symbol as well.

3.5. Sequence Index Change

A sequence (d(n)) for a legacy PSS is generated based on a ZC (Zadoff-chu) sequence of frequency domain and follows Formula I as follows.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases}$$ [Formula 1]

In this case, a ZC root sequence index (u) may refer to Table 11 in the following. Table 11 shows root sequence indexes for a PSS.

TABLE 11

| $N_{ID}^{(2)}$ | Root index u |
|---|---|
| 0 | 25 |
| 1 | 29 |
| 2 | 34 |

Referring to Table 11, a root sequence index for a PSS consists of 25, 29, and 34 in accordance with a physical layer identifier ($N_{ID}^{(2)}$) in a physical layer cell identifier group ($N_{ID}^{(1)}$).

Hence, in order to generate an extension PSS with a sequence different from the sequence for the legacy PSS, a root sequence index of the extension PSS, which is transmitted on an extension carrier, can be configured by a root sequence index different from the root sequence index for the legacy PSS.

4. The Generals of Device to which the Present Invention is Applicable.

Figure 11:
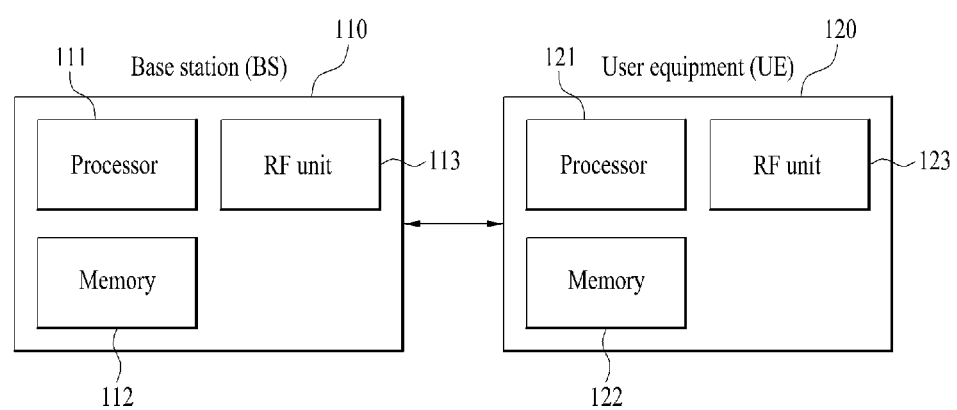
FIG. 11 is a block diagram of a wireless communication device according to one embodiment of the present invention.

FIG. 11 is a block diagram of a wireless communication device according to one embodiment of the present invention.

Referring to FIG. 11, a wireless communication system may include a base station (BS) 110 and a plurality of user equipments (UEs) 120 located within an area of the base station 110.

The base station 110 may include a processor 111, a memory 112 and an RF (radio frequency) unit 113. The processor 111 implements the proposed functions, processes and/or methods. Layers of a radio interface protocol can be implemented by the processor 111. The memory 112 is connected with the processor 111 and then stores various kinds of information to drive the processor 111. The RF unit 113 is connected with the processor 111 and then transmits and/or receives radio signals.

The user equipment 120 includes a processor 121, a memory 122 and an RF unit 123. The processor 121 implements the proposed functions, processes and/or methods. Layers of a radio interface protocol can be implemented by the processor 121. The memory 122 is connected with the processor 121 and then stores various kinds of information to drive the processor 121. The RF unit 123 is connected with the processor 221 and then transmits and/or receives radio signals.

The memory 112/122 may be provided within or outside the processor 111/121. And, the memory 112/122 may be connected with the processor 111/121 via various kinds of well-known means. Moreover, the base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method proposed by the present invention is described with reference to examples applied to 3GPP LTE system, it may be applicable to various kinds of wireless access systems as well as the 3GPP LTE system.

What is claimed is:

1. A method of transmitting a synchronization signal in a wireless access system supporting carrier aggregation, the method comprising:
    transmitting a first synchronization signal on an extension carrier not operating as a single carrier but operating as a part of the carrier aggregation only,
    wherein a resource region for transmitting the first synchronization signal is different from a resource region for transmitting a second synchronization signal transmitted on a legacy carrier capable of operating as a single carrier,
    wherein a frequency area of the resource region, on which the first synchronization signal is transmitted, corresponds to a frequency area where a center frequency of the frequency area of the resource region, on which the first synchronization signal is transmitted, is not an integer multiple of 100 kHz,
    wherein if the first synchronization signal corresponds to a primary synchronization signal and a secondary synchronization signal, one of the primary synchronization signal or the secondary synchronization signal is transmitted in a first subframe of a radio frame, and another of the primary synchronization signal or the secondary synchronization signal is transmitted in a sixth subframe of the radio frame,
    wherein if the first synchronization signal corresponds to only one of the primary synchronization signal or the secondary synchronization signal, the one of the primary synchronization signal or the secondary synchronization signal is transmitted in only one of the first or the sixth subframes of the radio frame, and
    wherein, when the radio frame is configured to transmit both the primary synchronization signal and the secondary synchronization signal, the another one of the primary synchronization signal or the secondary synchronization signal transmitted in the sixth subframe is frequency hopped; and
    transmitting information on a space between the first synchronization signal and the second synchronization signal.

2. The method of claim 1,
    wherein the space between the first synchronization signal and the second synchronization signal comprises a space between a time area of the resource region in which the first synchronization signal is transmitted and a time area of the resource region in which the second synchronization signal is transmitted via an upper layer signaling.

3. The method of claim 1, wherein the first synchronization signal is generated using a root sequence index except 25, 29, and 34.

4. A method of receiving a synchronization signal in a wireless access system supporting carrier aggregation, the method comprising:
    receiving a first synchronization signal on an extension carrier not operating as a single carrier but operating as a part of the carrier aggregation only,
    wherein a resource region for receiving the first synchronization signal is different from a resource region for receiving a second synchronization signal that is transmitted on a legacy carrier capable of operating as a single carrier,
    wherein a frequency area of the resource region, on which the first synchronization signal is received, corresponds to a frequency area where a center frequency of the frequency area of the resource region, on which the first synchronization signal is received, is not an integer multiple of 100 kHz,
    wherein if the first synchronization signal corresponds to a primary synchronization signal and a secondary synchronization signal, one of the primary synchronization signal or the secondary synchronization signal is received in a first subframe of a radio frame, and another of the primary synchronization signal or the secondary synchronization signal is received in a sixth subframe of the radio frame,
    wherein if the first synchronization signal corresponds to only one of the primary synchronization signal or the secondary synchronization signal, the one of the primary synchronization signal or the secondary synchronization signal is received in only one of the first or the sixth subframes of the radio frame, and
    wherein, when the radio frame is configured for both the primary synchronization signal and the secondary synchronization signal, the another one of the primary synchronization signal or the secondary synchronization signal received in the sixth subframe is frequency hopped; and
    receiving information on a space between the first synchronization signal and the second synchronization signal.

5. The method of claim 4,
    wherein the space between the first synchronization signal and the second synchronization signal comprises a space between a time area of the resource region in which the first synchronization signal is received and a time area of the resource region in which the second synchronization signal is received via an upper layer signaling.

6. The method of claim 4, wherein the first synchronization signal is generated using a root sequence index except 25, 29, and 34.

7. A base station for transmitting a synchronization signal in a wireless access system supporting carrier aggregation, comprising:
    a Radio Frequency unit configured to transceive a radio signal; and
    a processor configured to transmit a first synchronization signal on an extension carrier not operating as a single carrier but operating as a part of the carrier aggregation only,
    wherein a resource region for transmitting the first synchronization signal is different from a resource region for transmitting a second synchronization signal transmitted on a legacy carrier capable of operating as a single carrier,
    wherein a frequency area of the resource region, on which the first synchronization signal is transmitted, corresponds to a frequency area where a center frequency of the frequency area of the resource region, on which the first synchronization signal is transmitted, is not an integer multiple of 100 kHz, wherein if the first synchronization signal corresponds to a primary synchronization signal and a secondary synchronization signal, one of the primary synchronization signal or the secondary synchronization signal is transmitted in a first subframe of a radio frame, and another of the primary synchronization signal or the secondary synchronization signal is transmitted in a sixth subframe of the radio frame, wherein if the first synchronization signal corresponds to only one of the primary synchronization signal or the secondary synchronization signal, the one of the primary synchronization signal or the secondary synchronization signal is transmitted in only one of the first or the sixth subframes of the radio frame, wherein, when the radio frame is configured to transmit both the primary synchronization signal and the secondary synchronization signal, the another one of the primary synchronization signal or the secondary synchronization signal transmitted in the sixth subframe is frequency hopped, and wherein the processor is further configured to transmit information on a space between the first synchronization signal and the second synchronization signal.

8. A user equipment for receiving a synchronization signal in a wireless access system supporting carrier aggregation, comprising:

a processor configured to receive a first synchronization signal on an extension carrier not operating as a single carrier but operating as a part of the carrier aggregation only; and a memory and radio frequency unit each operatively coupled to the processor, wherein a resource region for receiving the first synchronization signal is different from a resource region for receiving a second synchronization signal that is transmitted on a legacy carrier capable of operating as a single carrier, wherein a frequency area of the resource region, on which the first synchronization signal is received, corresponds to a frequency area where a center frequency of the frequency area of the resource region, on which the first synchronization signal is received, is not an integer multiple of 100 kHz, wherein if the first synchronization signal corresponds to a primary synchronization signal and a secondary synchronization signal, one of the primary synchronization signal or the secondary synchronization signal is received in a first subframe of a radio frame, and another of the primary synchronization signal or the secondary synchronization signal is received in a sixth subframe of the radio frame, wherein if the first synchronization signal corresponds to only one of the primary synchronization signal or the secondary synchronization signal, the one of the primary synchronization signal or the secondary synchronization signal is received in only one of the first or the sixth subframes of the radio frame, wherein, when the radio frame is configured for both the primary synchronization signal and the secondary synchronization signal, the another one of the primary synchronization signal or the secondary synchronization signal received in the sixth subframe is frequency hopped, and wherein the processor is further configured to receive information on a space between the first synchronization signal and the second synchronization signal.

* * * * *